Figure 1:
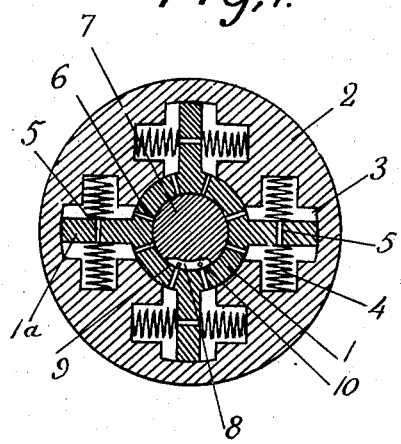

April 30, 1940.　　　P. DRAMINSKY　　　2,198,763
HYDRAULIC OSCILLATION DAMPER
Filed Jan. 21, 1938

INVENTOR
Per Draminsky

BY
ATTORNEY

Patented Apr. 30, 1940

2,198,763

UNITED STATES PATENT OFFICE 2,198,763

HYDRAULIC OSCILLATION DAMPER

Per Draminsky, Copenhagen, Denmark

Application January 21, 1938, Serial No. 186,260
In Denmark January 27, 1937

8 Claims. (Cl. 74—574)

For the absorption or damping of torsional oscillations in crank shafts it has been proposed to use oscillation absorbers or dampers consisting of an inertia mass rotatably mounted on the crank shaft, e. g. on one end thereof, and hydraulically coupled to the shaft whereby wings or cams rigidly connected with the same are adapted to move in fluid-tight compartments in the inertia mass. The two parts of each compartment, situated at opposite sides of the wing, communicate with each other through passages, preferably provided in the wings and yielding a great resistance to the passage of fluid, and through these passages the fluid contained in the said compartments will be pressed from one part or chamber to another, when the shaft and the inertia mass move relatively to each other. Between the inertia mass and the shaft springs are inserted. When the said springs are made with suitable dimensions, the absorbing action can be increased, because hereby the relative motion between the inertia mass and the shaft can be augmented.

Oscillation absorbers of the said kind may act very well in the case of small engines and a relatively small value of the occurring forces, but it has appeared, that large absorbers of this type intended to damp vigorous oscillations do not yield very far what they should yield theoretically. The reason is, that the said compartments do not remain liquid filled. Losses take place continuously through leaks, and therefore passages or apertures leading to the compartments must be arranged, through which liquid can be supplied to compensate for the loss through the leaks, but when the absorber is exposed to vigorous oscillations, the liquid pressure may very well become so high that more liquid is pressed out through the said apertures or passages than can manage to be sucked in again. The fact is, that the maximum liquid pressure in the compartments, if considerable impulses have to be absorbed, will often be about 10 kg./cm.$^2$, and the liquid employed to compensate for losses through leaks is normally oil taken from the usual lubricating oil system of the engine, so that a maximum superpressure of 1 kg./cm.$^2$ will be available. This means that during one half of the oscillatory period, in which superpressure is present in one set of compartments oil is pressed back through the supply apertures with the actual differential pressure, which may amount to 9 kg./cm.$^2$. During the following half of the oscillatory period the pressure in the same compartments will be lower than atmospheric pressure, but as this pressure cannot be lower than complete vacuum, i. e. 1 kg./cm.$^2$ below atmospheric pressure, a maximum differential pressure of 2 kg./cm.$^2$ will be available for the supply of oil. To secure a reliable oil supply in this manner the oil supply pressure had to be considerably higher than the lubricating oil pressure, which would require a particular oil pump and thus complicate the construction considerably.

Consequently a vacuum can be produced in the compartments in the known constructions, or air can be sucked in through the leaks, and as the presupposition of the good action of the absorber is that the compartments are liquid-filled, the efficiency of the absorber can be considerably reduced by the said facts.

The invention has for its object to do away with this deficiency in a hydraulic oscillation absorber or damper of the said kind, and it is mainly characterised thereby that the oscillation absorber is so constructed that the liquid-filled compartments communicate only periodically with a liquid supply device, and during the rest of time are kept closed, thus preventing the oil from passing back from the compartments and ensuring their being kept filled with liquid and preventing the arising of too high pressures in the compartments.

The invention may e. g. be carried out by employing a slide or similar device serving to keep the communicating passages or holes for the supply of liquid to the compartments closed during the main portion of a revolution, so that only during part or parts of a revolution to the compartments is allowed.

The oscillation absorber may e. g. be placed on the shaft, the oscillations of which have to be absorbed, around a stationary slide. The latter may be connected with and get a supply of oil from oil passages in the shaft communicating f. inst. with a pressure lubricating system.

The invention is illustrated in the accompanying drawing, in which

Figure 2:
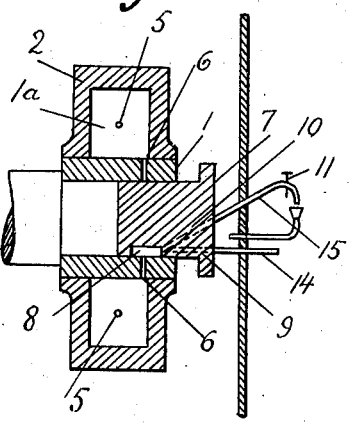
Figure 3:
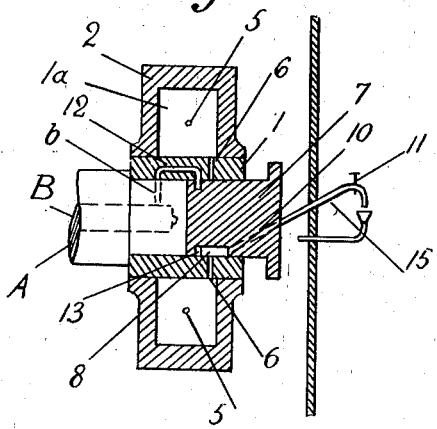
Figure 4:
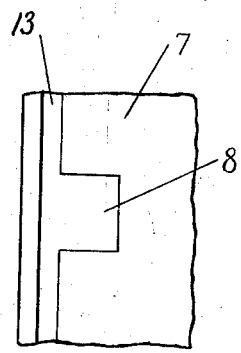

Fig. 1 is a cross section through a constructional form of a hydraulic oscillation absorber according to the invention, Fig. 2 is a longitudinal section through the same, Fig. 3 shows a modified constructional form of part of Fig. 2, and Fig. 4 is an evolution of part of the slide shown in Fig. 3.

Referring now to Figs. 1 and 2, *I* is a part rigidly connected with the shaft A and carrying a number of radial wings or cams 1a, in total four in the illustrated constructional form. Around the part 1 and rotatable in relation thereto a part 2 is mounted, which will be called "inertia mass" in the following and in which are formed some compartments 3, into which the wings 1a enter. Between the said compartments 3 the material of the inertia mass 2 extends fully to the part 1, against which the inertia mass bears. The compartments 3 in the inertia mass 2 extend somewhat to both sides of the wings 1a and enclose vigorous springs 4 tending to keep the part 1 with the wings 1a in such a position that the latter are in their central position relatively to the compartments. In the wings 1a, the faces of which bear against the material of the inertia mass, holes 5 are bored having a diameter which is exactly calculated in regard to the desired absorbing effect. The part 1 has, besides, a number of holes 6, which may be radial as indicated, and which lead at their outer end into the compartments 3, one hole on each side of a wing 1a, while their inner ends face a stationary slide 7, so that they are normally closed. The slide 7 has, however, a recess 8 communicating through a bore 9 with an oil supply pipe 14 and, contingently, also through a bore 10 with a pipe 15 leading to a control cock 11 outside the engine. The slide 7 may be kept stationary in any suitable manner.

The oscillation absorber proper acts according to the principle known per se, but the employment of the slide 7 has for its result that the compartments 3 are kept closed during the main portion of the revolution of the shaft A and herewith also of the parts 1 and 2. Only during the part of a revolution where a hole or pair of holes 6 faces the recess 8 access is open to the corresponding compartment 3 for oil supply from the pipe 14 and bore 9. The communication through the holes 6 and recesses 8 reduces the pressure difference between the parts of the compartments on both sides of the wings 1a, so that the supply of oil can take place easier. Excess of oil can escape through the bore 10 and pipe 15 to the control cock 11.

In the constructional form according to Figs. 3 and 4 the oil is supplied through the crank shaft proper, which is supposed to have lubricating oil bores communicating with a lubricating pressure system. A bore of this kind in the shaft is indicated by B, and this bore communicates through a transverse bore b and bores 12 in the hub of the part 1 with an annular recess 13 in the stationary slide 7. The recess 15 communicates with the recess 8 as shown in Fig. 4, and in this manner oil can be supplied under pressure to the hole or holes 6 facing the recess 8, while the holes 6 and corresponding compartments 3 are closed as described with reference to Figs. 1 and 2. Also in this constructional form a pipe 15 may lead from the recess 8 through a bore 10 to a control cock 11.

The invention is not limited to the illustrated and described constructional forms, which are only given by way of example to illustrate the principle of the invention.

I claim:

1. A hydraulic oscillation absorber or damper for rotating engine parts comprising an inertia mass, compartments in said mass designed to hold a fluid, projecting members fixed to the rotating engine part and extending into said compartments and means for supplying fluid to said compartments, said means being controlled positively in dependency of the revolution of said rotating engine part so as to supply the fluid periodically during said revolution.

2. A hydraulic oscillation absorber or damper for rotating engine parts, comprising an inertia mass, compartments in said mass designed to hold a fluid, projecting members fixed to the rotating engine part and extending into said compartments, means normally holding said projecting members substantially at the centers of said compartments, a source of fluid supply and means for supplying fluid to said compartments said means being controlled positively in dependency of the revolution of said rotating engine part so as to establish communication between the compartments and the source of fluid during a fixed portion of the revolution.

3. A hydraulic oscillation absorber or damper for rotating engine parts comprising an inertia mass, compartments in said mass designed to hold a fluid, projecting members fixed to the rotating engine part and extending into said compartments, conduits for leading a fluid to said compartments and a single valve member controlling all said conduits so as to feed fluid to said compartments periodically during the revolution of said rotating engine part.

4. A hydraulic oscillation absorber or damper for rotating engine parts comprising an inertia mass, compartments in said mass designed to hold a fluid, projecting members fixed to the rotating engine part and extending into said compartments, a series of conduits extending through the rotating engine part for conducting fluid to said compartments and a stationary slide having a fluid supply conduit adapted to successively connect with said conduits to supply fluid intermittently to said compartments.

5. A hydraulic oscillation absorber or damper for rotating engine parts comprising an inertia mass, compartments in said mass designed to hold a fluid, projecting members fixed to the rotating engine part and extending into said compartments, a series of conduits extending through the rotating engine part for conducting fluid to said compartments and a stationary slide coaxially mounted with relation to said engine part and having a supply conduit adapted to successively connect with the conduits of said series.

6. A hydraulic oscillation absorber for rotating engine parts comprising an inertia mass having compartments therein designed to hold a fluid, vanes fixed to a rotating engine part extending into the said compartments, means permitting escape of the fluid from one side to the other of the rotating engine part, fluid supply conduits in said vanes leading to said compartments and a stationary slide having a conduit adapted to connect with said fluid supply conduits successively.

7. A hydraulic oscillation absorber for rotating engine parts comprising an inertia mass having compartments therein designed to hold a fluid, vanes fixed to a rotating engine part extending into the said compartments, means permitting escape of the fluid from one side to the other of the rotating engine part, fluid supply conduits in said vanes leading to said compartments, a stationary slide associated with said vanes controlling said fluid supply conduits and a fluid conduit in said slide connected with the pressure lubricating system of the engine which is brought successively into connection with the conduits in the rotating engine part.

8. A hydraulic oscillation absorber for rotating engine parts comprising an inertia mass having compartments therein designed to hold a fluid, vanes fixed to a rotating engine part extending into the said compartments, means permitting escape of the fluid from one side to the other of the rotating engine part, fluid supply conduits in said vanes leading to said compartments, a stationary slide having a conduit connected to a fluid supply which is designed to be brought successively into connection with the conduits in the rotating engine part, a discharge conduit also in said slide communicating with said conduit connected to a fluid supply and a valve controlling said discharge conduit.

PER DRAMINSKY.